US005771572A

United States Patent [19]
Mellander et al.

[11] Patent Number: 5,771,572
[45] Date of Patent: Jun. 30, 1998

[54] APPARATUS FOR ASSEMBLING AN AIR BAG UNIT AND AN INFLATOR INTO AN INFLATOR-AIR BAG ASSEMBLY

[75] Inventors: Paul Willard Mellander; Terrence William Hurtig, both of Dayton, Ohio

[73] Assignee: Omega Automation, Inc., Dayton, Ohio

[21] Appl. No.: 791,479

[22] Filed: Jan. 27, 1997

[51] Int. Cl.[6] .............................. B23P 21/00; B23P 19/02
[52] U.S. Cl. .......................... 29/701; 29/525.02; 29/787
[58] Field of Search ........................ 29/701, 787, 525.02, 29/525.04

[56] References Cited

U.S. PATENT DOCUMENTS

| 4,773,156 | 9/1988 | Kurita | 29/787 |
| 5,575,748 | 11/1996 | Budde et al. | |
| 5,673,471 | 10/1997 | Blaisdell et al. | 29/451 |

FOREIGN PATENT DOCUMENTS

| 2146274 | 4/1985 | United Kingdom | 29/701 |

*Primary Examiner*—P. W. Echols
*Attorney, Agent, or Firm*—Killworth, Gottman, Hagan & Schaeff, L.L.P.

[57] ABSTRACT

An apparatus is provided for assembling an inflator and an air bag unit into an inflator-air bag assembly. The apparatus comprises a frame and a holder device coupled to the frame. The holder device includes a movable nest adapted to receive an air bag unit and an inflator. The air bag unit has at least one stud which is capable of passing through at least one stud receiving opening provided in the inflator. The nest is adapted to move the air bag unit and the inflator such that the stud is moved to a nut-applying station. The apparatus further includes a driver unit coupled to the frame which is adapted to secure the nut to the stud to assemble the inflator and the air bag unit into an inflator-air bag assembly. The apparatus additionally includes a clamping element movably coupled to the support structure for engaging the inflator when the support structure is in the nut-securement position so as to act with the nest to clamp the inflator and the air bag unit together. The clamping element moves with the inflator and the air bag unit as the stud is moved to the nut-applying station by the nest.

16 Claims, 6 Drawing Sheets

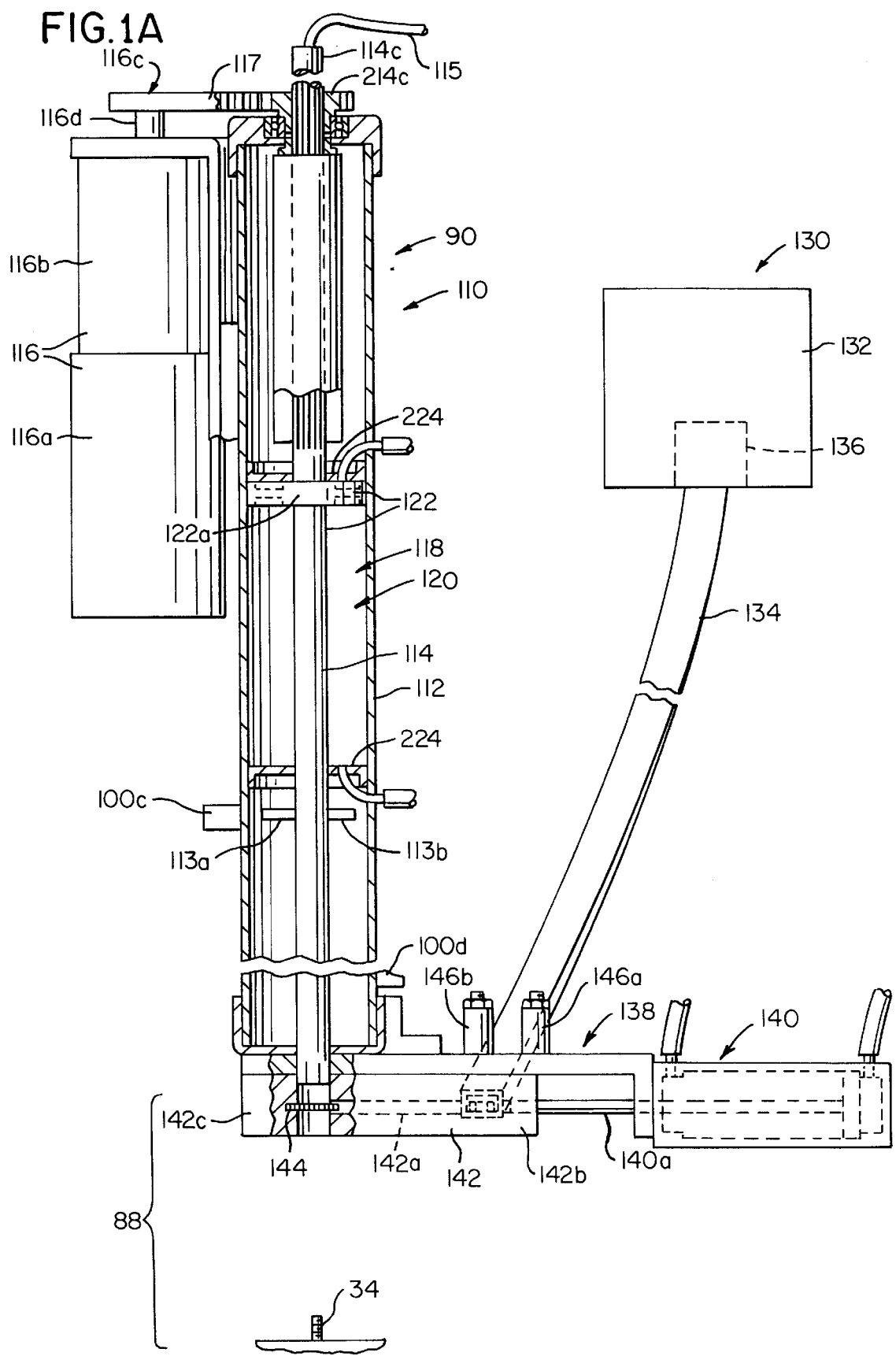

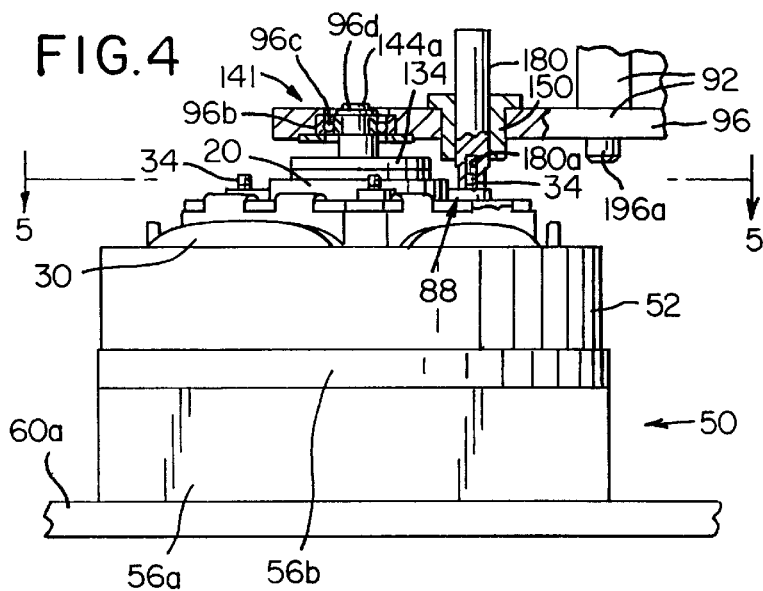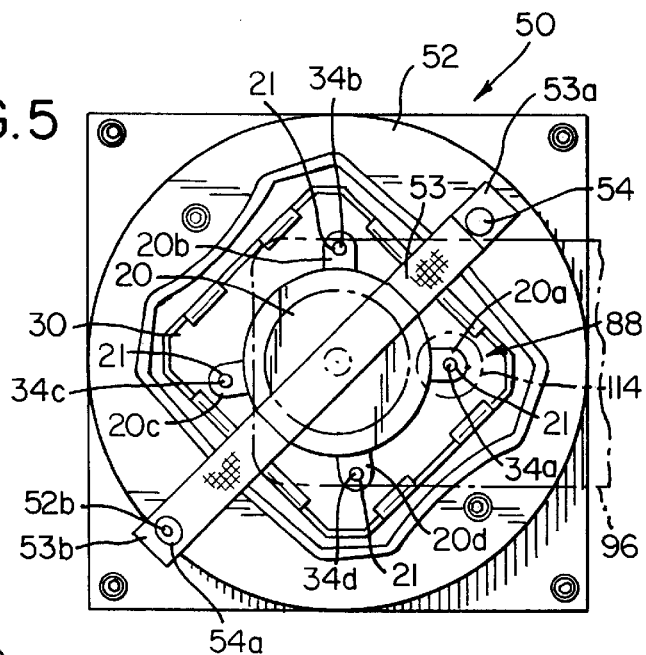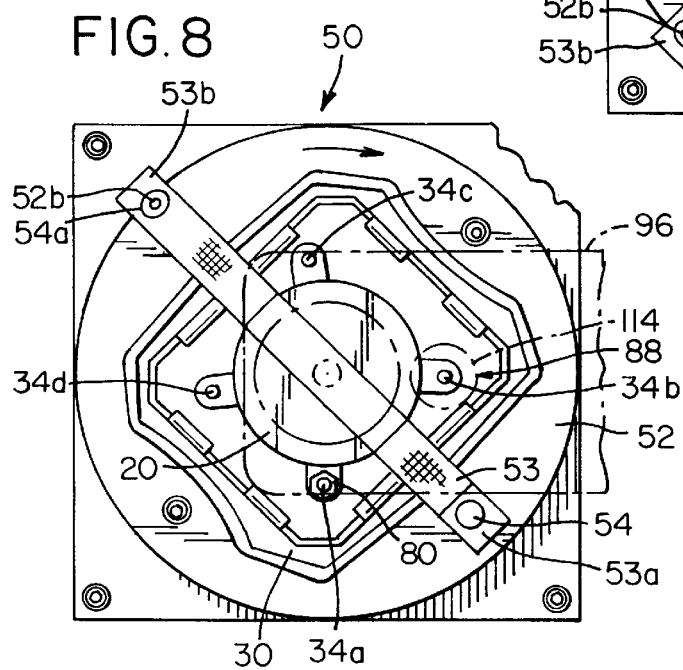

APPARATUS FOR ASSEMBLING AN AIR BAG UNIT AND AN INFLATOR INTO AN INFLATOR-AIR BAG ASSEMBLY

BACKGROUND OF THE INVENTION

The present invention relates to a method and apparatus for assembling an inflator and an air bag unit into an inflator-air bag assembly.

It is known in the art to employ nut driver apparatus in processes for assembling inflators and air bag units together. One known apparatus includes a support structure which is capable of moving back and forth between a retracted position and a nut-applying position. Mounted to the support structure are two nut drivers which are adapted to simultaneously apply two nuts to two of four spaced-apart studs extending from the air bag unit. The driver apparatus further includes a rotatable nest which is capable of rotating back and forth through a fixed angle, e.g., 180°. A piston/cylinder unit is provided for effecting rotation of the nest. Once two nuts have been secured to the two studs, the support structure is raised to allow the nest to be rotated via the piston/cylinder unit so as to position the two remaining studs under the two drivers. The support structure is then lowered again to allow the two drivers to apply nuts to the two remaining studs such that the inflator is joined to the air bag unit.

While this apparatus is capable of applying nuts to studs extending from an air bag unit so as to assemble an inflator and an air bag unit into an inflator-air bag assembly, it would be desirable to have an apparatus which has fewer structural parts and is capable of effecting assembly in less time.

SUMMARY OF THE INVENTION

In accordance with the present invention, improved methods and apparatus are provided for assembling an inflator and an air bag unit into an inflator-air bag assembly. In a preferred embodiment, the apparatus includes a single nut driver device and a nest which is rotated via a stepper-motor. The stepper-motor is capable of rotating the nest such that the nest is positioned below the nut driver device in any one of an almost innumerable number of positions. The apparatus further includes a rotatable clamping element which allows the driver support structure to be maintained in a "down" position as the work-pieces are rotated between nut-securement operations. Hence, the multiple nut-securement operations are capable of being performed during a reduced time cycle as the support structure is not required to be elevated between nut-securement operations. Further, one nut driver device rather than two may be provided which reduces the cost of the apparatus.

In accordance with a first aspect of the invention, an apparatus is provided for assembling an inflator and an air bag unit into an inflator-air bag assembly. The apparatus comprises a frame and a holder device. The holder device is coupled to the frame and includes a movable nest adapted to receive an air bag unit and an inflator. The air bag unit has at least one stud which is capable of passing through at least one stud receiving opening provided in the inflator. The nest is adapted to move the air bag unit and the inflator such that the at least one stud is moved to a nut-applying station. The apparatus further includes a driver unit coupled to the frame which is adapted to secure the at least one nut to the at least one stud to assemble the inflator and the air bag unit into an inflator-air bag assembly. The driver unit comprises support structure which is movable back and forth between a retracted position and a nut-securement position, and a nut driver device which is coupled to the support structure such that the nut driver device is positioned at the nut-applying station when the support structure is located in the nut-securement position and is adapted to join the at least one nut to the at least one stud. The driver unit additionally includes a clamping element movably coupled to the support structure for engaging the inflator when the support structure is in the nut-securement position so as to act with the nest to clamp the inflator and the air bag unit together. The clamping element moves with the inflator and the air bag unit as the stud is moved to the nut-applying station by the nest.

The apparatus further includes a processor for controlling the operation of the holder device and the driver unit.

The holder device preferably further comprises a rotary table including a base portion which is fixedly mounted to the frame, a rotatable upper portion which is coupled to the base portion and fixedly coupled to the nest, and a motor for effecting rotation of the upper portion. The motor is preferably coupled to the processor such that the processor controls the operation of the motor. The motor may comprise a servomotor or a stepper-motor.

The clamping element comprises a plate member and a shaft which is fixed to the plate member. The support structure comprises a clamping element support plate having an opening provided with a bearing for rotatably receiving the shaft of the clamping element.

The nut driver device may comprise: a spindle having a recess in a distal end thereof for receiving a nut; a first spindle drive device adapted to effect rotation of the spindle; and a second spindle drive device adapted to effect movement of the spindle such that the spindle moves from a retracted position to an initial nut-fastening position where the nut is in engagement with the stud to a final nut-fastening position where the nut has been fully secured to the stud.

In accordance with a second aspect of the present invention, an apparatus is provided for assembling an inflator and an air bag unit into an inflator-air bag assembly. The apparatus comprises a frame and a holder device coupled to the frame. The holder device includes a rotatable nest adapted to receive an air bag unit and an inflator. The air bag unit has at least two studs which are capable of passing through at least two stud receiving openings provided in the inflator. The nest is adapted to rotate the air bag unit and the inflator such that the at least two studs are moved to a nut-applying station in a defined pattern. The apparatus further includes a driver unit adapted to secure the at least two nuts to the at least two studs to assemble the inflator and the air bag unit into an inflator-air bag assembly. The driver unit comprises support structure which is movable back and forth between a retracted position and a nut-securement position, and a nut driver device which is coupled to the support structure such that the nut driver device is positioned at the nut-applying station when the support structure is located in the nut-securement position and is adapted to join the nuts to the studs. The driver unit additionally includes a clamping element rotatably coupled to the support structure for engaging the inflator when the support structure is in the nut-securement position so as to act with the nest to clamp the inflator and the air bag unit together. The clamping element rotates with the inflator, the air bag unit and the nest as the studs are moved to the nut-applying station in a defined manner.

Accordingly, it is an object of the present invention to provide a method and apparatus for assembling an inflator and an air bag unit into an inflator-air bag assembly. It is further an object of the present invention to provide an apparatus for assembling an inflator and an air bag unit into an inflator-air bag assembly having a nest which is rotated via a processor-controlled motor. It is another object of the present invention to provide an apparatus for assembling an inflator and an air bag unit into an inflator-air bag assembly having a rotatable clamping element which engage and rotates with the inflator. These and other objects and advantages of the present invention will be apparent from the following description, the accompanying drawings and the appended claims.

BRIEF DESCRIPTION OF THE DRAWINGS

FIG. 1A is a side view, partially in cross section, of a nut driver device and nut supply apparatus used in the present invention;

FIGS. 2–4 are side views, partially in section, illustrating calibration of the apparatus illustrated in FIG. 1;

FIG. 5 is a view taken along view line 5—5 in FIG. 4;

FIG. 8 is a plan view of a holder device of the apparatus illustrated in FIG. 1 and illustrating one nut applied to a stud of the air bag unit and a second stud positioned at a nut-applying station;

DETAILED DESCRIPTION OF THE PREFERRED EMBODIMENT

Figure 1:
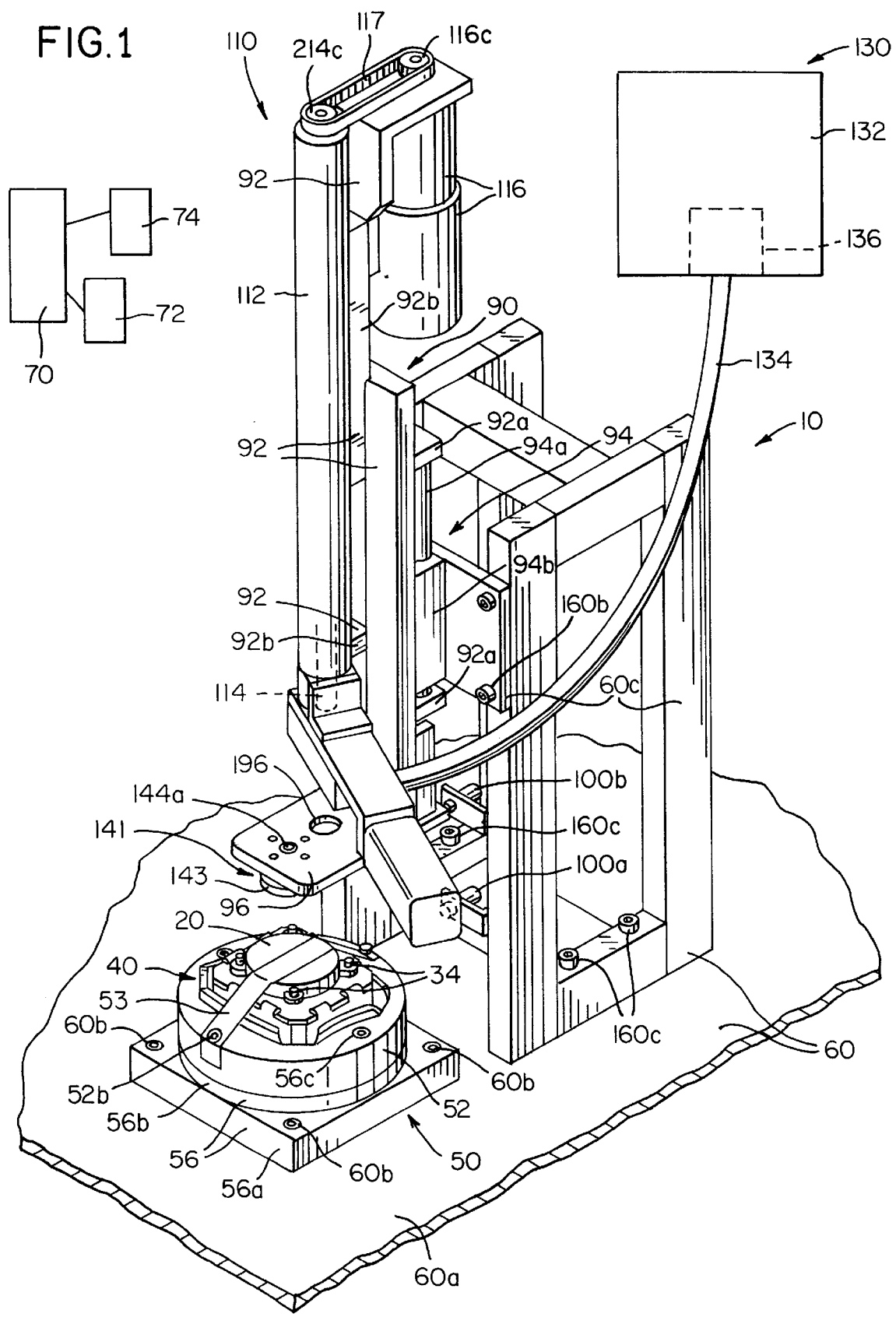
FIG. 1 is a perspective view of an apparatus constructed in accordance with the present invention.
Figure 10:
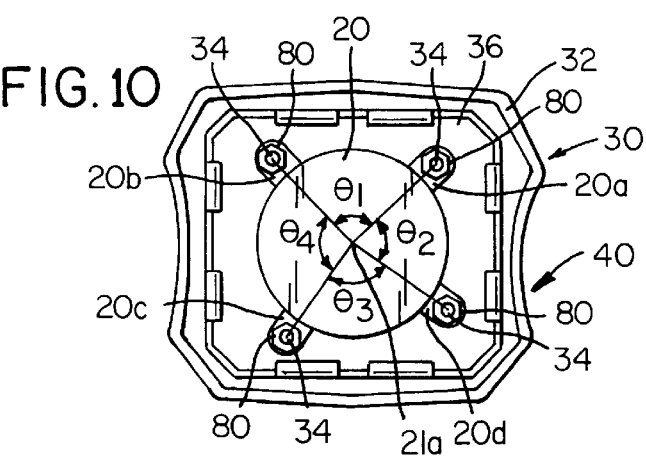
FIG. 10 is a top view of an inflator-air bag assembly.

In FIG. 1, an apparatus 10 is shown constructed in accordance with the present invention for assembling an inflator 20 and an air bag unit 30 into an inflator-air bag assembly 40. In the illustrated embodiment, the air bag unit 30 comprises a steering wheel cover 32, an air bag device having four threaded studs 34 extending therefrom and a retainer plate 36, see FIG. 10. An apparatus for assembling a steering wheel cover, an air bag device and a retainer plate into an air bag unit is disclosed in copending application Ser. No. 08/754,861 entitled "APPARATUS FOR USE IN ASSEMBLING A STEERING WHEEL COVER, AN AIR BAG DEVICE AND A RETAINER PLATE INTO A SINGLE UNIT," by Walker et al. (Attorney Docket No. OME011PA), filed Nov. 22, 1996, the disclosure of which is incorporated herein by reference. The inflator 20 is a conventional device for inflating the air bag of the unit 30. The inflator 20 includes four ears 20a–20d each of which is provided with an opening 21 for receiving one of the four studs 34 extending from the air bag unit 30, see FIGS. 5 and 10.

The apparatus 10 includes a holder device 50 for receiving the air bag unit 30 and the inflator 20, see FIG. 1. The holder device 50 includes a nest 52 having a recess 52a, see FIG. 2., for receiving the air bag unit 30. In the illustrated embodiment, the nest 52 is formed from a polymeric material. Further provided is a tie-down strap 53 which is fixedly connected to the nest 52 via a fastener 54 at one end 53a of the strap 53 and includes an eyelet 54a at its opposite end 53b which is adapted to be fitted over a pin 52b extending out from the nest 52 so as to snugly hold the inflator 20 against the air bag unit 30, see FIG. 5. The strap 53 also secures the inflator 20 and the air bag unit 30 in position in the nest 52.

As noted above, the air bag unit 30 has four studs or bolts 34 extending outwardly from it. The bolts 34 may be positioned such that each of four angles extending from the center 21a of the inflator 20 to the bolts 34 equals 90°. Alternatively, the bolts 34 may be positioned such that two or more of the four angles defined by the inflator center 21a and the four bolts 34 do not equal 90°. In the illustrated embodiment, see FIG. 10, angles $\theta_1$ and $\theta_3$ equal approximately 90°, and angles $\theta_2$ and $\theta_4$ equal approximately 80° and 100° respectively. As also noted above, the inflator 20 includes four ears 20a–20d, each of which is provided with a bolt receiving opening 21. The ears 20a–20d are angularly positioned so as to correspond to the angular positions of the four bolts 34. Because of the values of the four angles $\theta_1$–$\theta_4$ in the illustrated embodiment, the openings 21 in the ears 20a–20d can only receive the four bolts 34 if the inflator 20 is properly oriented relative to the air bag unit 30. If not, all four bolts 34 will not pass through the openings 21 in the ears 20a–20d. Thus, the location of the four bolts 34, or the values of the four angles $\theta_1$–$\theta_4$ defined by the inflator center 21a and the four bolts 34, provides a mechanism to ensure that an operator will properly orient an inflator 20 relative to its corresponding air bag unit 30.

Figure 2:
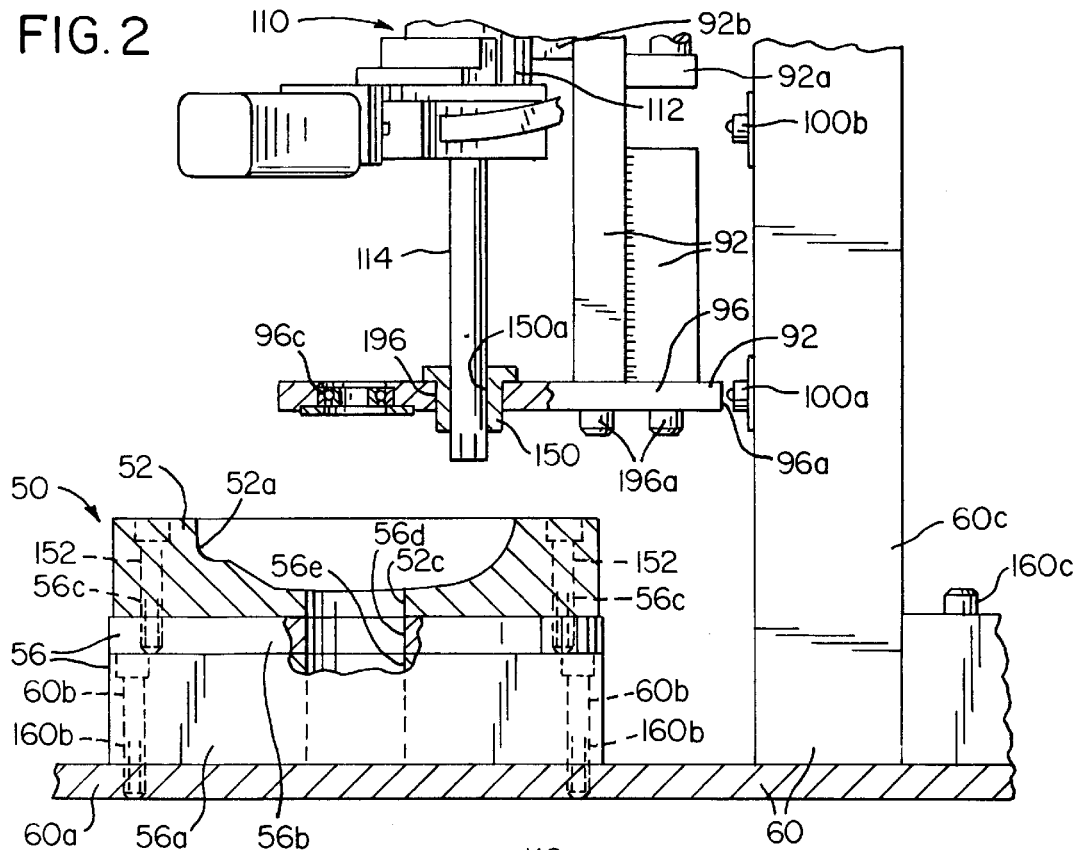

The holder device 50 further includes a rotary table 56 having a base portion 56a which is fixedly mounted to a plate portion 60a of a support frame 60 of the apparatus 10 via bolts 60b, see FIG. 2. The rotary table 56 additionally includes a rotatable upper portion 56b which is rotatably coupled to the base portion 56a and fixedly coupled to the nest 52 via bolts 56c. A motor (not shown) forming part of the rotary table 56 and coupled to the upper portion 56b effects rotation of the upper portion 56b and, hence, the nest 52, relative to the base portion 56a. In the illustrated embodiment, the motor comprises a stepper-motor comprising a motor portion and a driver/indexer unit. The stepper-motor is controlled via a commercially available processor 70 such as a programmable logic controller (PLC). The motor may also comprise a servomotor or any other device capable of effecting rotation of the upper portion 56b relative to the base portion 56a in an acceptable manner. The rotary table 56 described herein is commercially available from Parker Motion and Control, Daedal and Compumotor divisions.

The processor 70 generates signals to the stepper-motor causing it to rotate the air bag unit 30 and the inflator 20 such that the studs 34 are moved to a nut-applying station 88 in a defined pattern, see FIGS. 5 and 8. One by one, nuts 80 are secured to the studs 34 via a driver unit 90, shown in FIGS. 1 and 1A, as the studs 34 are moved to the nut-applying station 88. Once all the studs 34 have received a nut 80, assembly of the inflator 20 and the air bag unit 30 into an inflator-air bag assembly 40 is complete.

Figure 6:
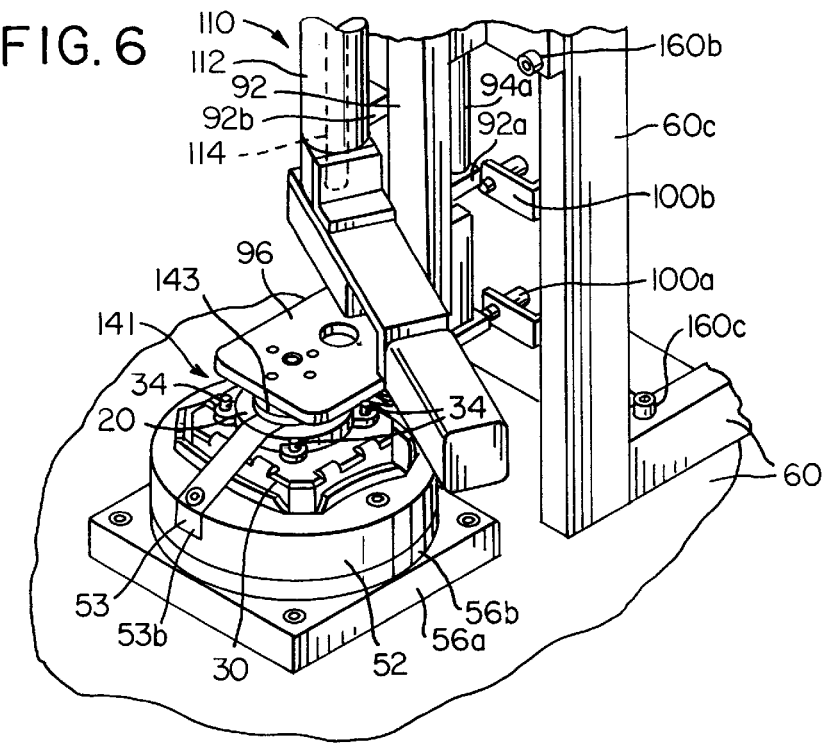
FIG. 6 is a perspective view of a portion of the apparatus illustrated in FIG. 1 with support structure of the apparatus shown in a nut-securement position.
Figure 9:
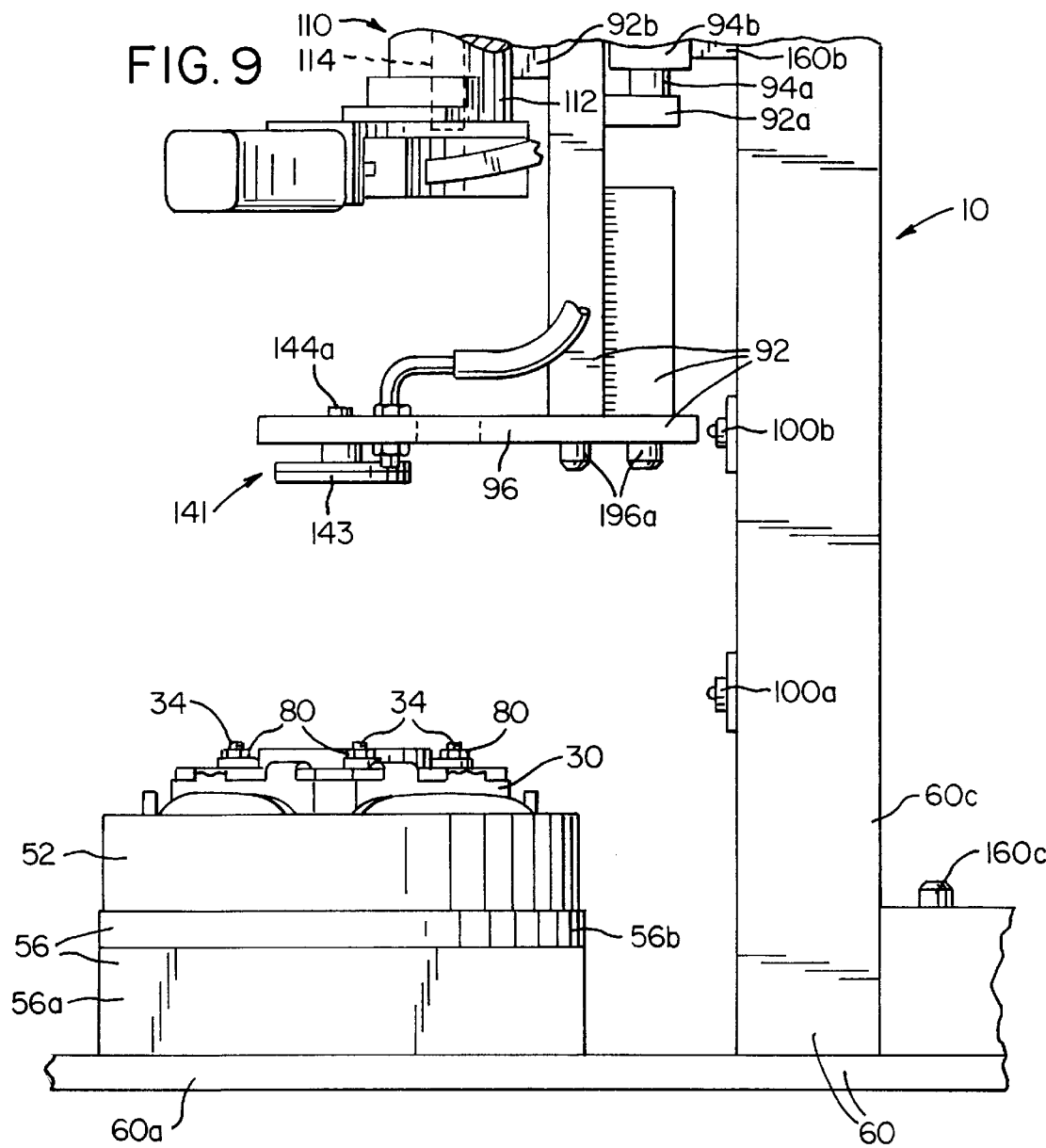
FIG. 9 is a side view of a portion of the apparatus illustrated in FIG. 1 with the support structure shown in a retracted position.

The driver unit 90 comprises support structure 92 which is movable back and forth between a retracted position, shown in FIGS. 1 and 9, and a nut-securement position shown in FIGS. 4 and 6. The support structure 92 is fixedly connected via bolts (not shown) and plates 92a to two guide rods 94a (only one guide rod 94a is illustrated in FIG. 1) and a piston (not shown) of a conventional pneumatic piston/cylinder unit 94. The piston/cylinder unit 94 further includes a cylinder device 94b which is fixedly connected to a plate 160b forming part of an upper portion 60c of the apparatus support frame 60. Thus, actuation of the piston/cylinder unit 94 via a valve forming part of a conventional valve bank 72, which valve bank 72 is controlled by the processor 70, effects vertical movement of the support structure 92 to one of its retracted and nut-securement positions.

Figure 7:
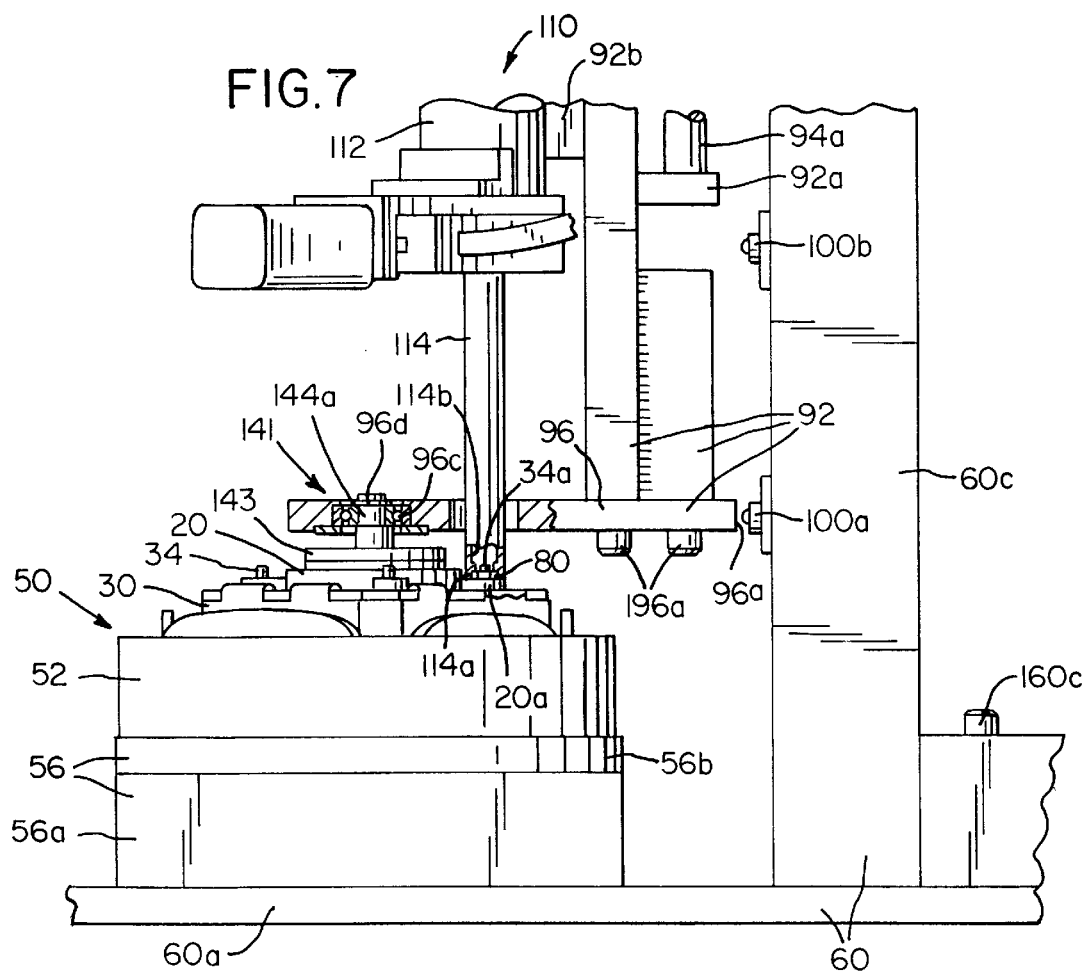
FIG. 7 is a side view of a portion of the apparatus illustrated in FIG. 1 with the support structure shown in a nut-securement position and a driver device spindle applying a nut to a stud of an air bag unit.

First and second conventional proximity sensors 100a and 100b are fixedly mounted to the upper portion 60c of the support frame 60, see FIGS. 1 and 9. The support structure 92 includes a clamping element support plate 96. The first sensor 100a senses a rear edge 96a of the clamping element support plate 96 when the support structure 92 is in its nut-securement position and generates a nut-securement-position signal to the processor 70, see FIG. 7. The second sensor 100b senses the rear edge 96a of the clamping element support plate 96 when the support structure 92 is in its retracted position and generates a support-structure-retracted position signal to the processor 70, see FIG. 9.

The driver unit 90 further includes a conventional nut driver device 110 which is adapted to threadedly secure nuts 80 to the studs 34, see FIGS. 1 and 1A. The driver device 110 includes a housing portion 112 which is fixedly coupled to brackets 92b of the support structure 92 such that the housing portion 112 moves with the support structure 92. Extending through the housing portion 112 is a spindle 114 having a recess 114a in a distal end thereof for receiving a nut 80, see FIG. 7. The spindle 114 further includes a bore 114b which completely extends through the spindle 114 from the recess 114a to an opposite end 114c of the spindle 114. The bore 114b is adapted to communicate with a vacuum source (not shown) through a conduit 115, see FIG. 1A, such that vacuum pulled through the bore 114b holds a nut 80 in the recess 114a.

The driver device 110 further includes a first spindle drive device 116 which comprises a conventional motor 116a and a torque transducer/angle encoder unit 116b. A first pinion gear 116c is fixedly connected to an output shaft 116d of the unit 116b, see FIGS. 1 and 1A. The spindle 114 extends through a second pinion gear 214c which is rotatably supported on the housing portion 112. The second pinion gear 214c has an internal spline (not shown) which engages with a longitudinally extending notch (not shown) provided in the outer surface of the spindle 114 such that rotation of the second pinion gear 214c effects rotation of the spindle 114. The spindle 114 is capable of moving vertically up and down through the second pinion gear 214c. The second pinion gear 214c is not capable of moving vertically relative to the housing portion 112. Operation of the motor 116a effects rotary motion of the output shaft 116d of the unit 116b. Rotation of the shaft 116d, in turn, effects rotation of the spindle 114 through the pinion gears 116c and 214c and a belt 117 which extends about the pinion gears 116c and 214c.

The torque transducer/angle encoder unit 116b monitors the torque applied to the spindle 114 as the spindle 114 turns a given nut 80 on a stud 34 and generates torque value signals to a conventional driver device controller 74. The torque transducer/angle encoder unit 116b also monitors the angular position of the spindle 114 and generates angular position signals to the controller 74. The controller 74 effects operation of the motor 116a until: 1) a predetermined torque has been applied to the spindle 114 and, hence, to a nut 80, and 2) the spindle 114 has moved to a predetermined angular position. The controller 74 also generates error signals if the desired torque value or angular position has not been achieved. An error signal generally results when a nut 80 is not properly secured to the threaded stud 34.

The processor 70 generates signals to the driver device controller 74 instructing it to initiate rotation of the spindle 114. The driver device controller 74 generates signals to the processor 70 informing it whether a given nut-turning operation has been completed successfully.

The driver device 110 additionally includes a second spindle drive device 118 which effects vertical up and down movement of the spindle 114 relative to the housing portion 112. The spindle 114 is moved by the second drive device 118 from a retracted position, shown in FIGS. 1 and 6, to an initial nut-fastening position, where a nut 80 is in initial engagement with a stud 34, and to a final nut-fastening position, shown in FIG. 7, where the nut 80 has been fully tightened onto the stud 34. The second drive device 118 then moves the spindle 114 back to its retracted position.

In the illustrated embodiment, the second drive device 118 includes a pneumatic piston/cylinder unit 120. The piston 122 of the piston/cylinder unit 120 is defined by a portion of the outer surface of the spindle 114 and a collar 122a fixed to the outer surface of the spindle 114. The cylinder 124 is defined by a section of the housing portion 112 and two end plates 224, through which the spindle 114 is vertically movable. The unit 120 does not inhibit rotation of the spindle 114. When air is input into one of two inlets into the cylinder 124 via a valve forming part of the valve bank 72, the spindle 114 is caused to move vertically. As noted above, the valve bank 72 is controlled via the processor 70. It is also contemplated that other drive devices may be provided for effecting vertical movement of the spindle 114 relative to the housing portion 112 such as a screw-type drive unit (not shown) where a gear or like device engages threads provided on the spindle 114 to effect vertical movement of the spindle 114.

The driver device 110 including the controller 74 are commercially available from Weber Screwdriving Systems, Inc., Mount Kisco, N.Y., under the product designations "WEBER SUM-4660 Vacuum Nutdriver Spindle," "Sure-Tork DC Motor System," and "Single 'SureTork' Controller."

Third and fourth conventional proximity sensors 100c and 100d, shown only in FIG. 1A, are fixedly mounted to the housing portion 112. The spindle 114 has first and second flags 113a and 113b which are fixedly secured to it. The third sensor 100c senses the first flag 113a when the spindle 114 is in its retracted position and generates a spindle-retracted signal to the processor 70, see FIG. 1A. The fourth sensor 100d senses the second flag 113b when the spindle 114 has moved the nut 80 to approximately 0.0625 inch of being set on the stud 34 and generates a nut-set signal to the processor 70.

The driver unit 90 also includes a conventional nut supply apparatus 130 including a nut supply bowl 132, a substantially rectangular nut supply tube 134, a nut feed device 136 and a nut receiving device 138. The nut feed device 136 and the supply bowl 132 are schematically shown in FIGS. 1 and 1A. The nut supply apparatus 130 is commercially available from Weber Screwdriving Systems, Inc., Mount Kisco, N.Y., under the product designation "ZEM-300 Vibratory Nut Feeder." Operation of the nut supply apparatus 130 is controlled by the processor 70.

The nut feed device 136 comprises a conventional rotary escapement mechanism (not shown) which receives nuts 80 from the supply bowl 132 and supplies the nuts 80 one at a time to the supply tube 134. A conventional sensor (not shown) senses when a nut has been delivered to the inlet of the supply tube 134 and actuates a pneumatic feed device (not shown) which pneumatically moves a given nut 80 through the supply tube 134 to the nut receiving device 138.

The nut receiving device 138 includes a piston/cylinder unit 140 and a guide 142 having a slot 142a extending through it. The guide 142 is coupled to the supply tube 134 such that each nut 80 is delivered to a rear section 142b of the guide 142 by the supply tube 134. When a given nut 80 has been received in the guide 142, the nut 80 is moved to a front section 142c of the guide 142 by a piston 140a of the piston/cylinder unit 140. The nut 80 is received between two spring-biased fingers 144 as it moves to the front section 142c of the guide 142. The fingers 144 support the nut 80 until the spindle 114 moves vertically downward and captures the nut in its recess 114a. The fingers 144 flex outwardly as the spindle 114 moves downwardly thereby permitting the spindle 114 to capture the nut 80 and extend through the fingers 144. Vacuum maintains the nut 80 in the recess 114a. The spindle 114 then continues its downward movement so as to secure the nut 80 onto a stud 34.

Fifth and sixth proximity sensors 146a and 146b are provided on the guide 142 and sense the position of the piston 140a in the guide 142. When the piston 140a is in its retracted position, the sensor 146a senses a first flag on the piston 140a and generates a piston-retracted signal to the processor 70. When the piston 140a is in its extended position such that the nut 80 has been moved to the front section 142c of the guide 142, the sensor 146b senses a second flag on the piston 140a and generates a piston-extended signal to the processor 70.

The driver unit 90 additionally includes a clamping element 141 which is rotatably coupled to the plate 96 of the support structure 92, see FIGS. 1 and 4. The clamping element 141 engages an inflator 20 when the support structure 92 is in the nut-securement position and, as such, acts with the nest 52 to clamp the inflator 20 and an associated air bag unit 30 together, see FIG. 6. The clamping element 141 comprises a plate member 143 and a shaft 144a which is fixed to the plate member 143. The plate 96 has an opening 96b provided with a bearing 96c for rotatably receiving the shaft 144a of the clamping element 141. A retainer ring 96d is provided for securing the shaft 144a in the bearing 96c. The clamping element 141 rotates with the inflator 20, the air bag unit 30 and the nest 52 as the studs 34 are moved to the nut-applying station 88 in a defined manner.

Before the apparatus 10 can be operated to assemble an inflator 20 and an air bag unit 30 into an inflator-air bag assembly 40, the apparatus 10 must be properly set up. A set-up process and elements for use in doing so will now be described.

Initially, a first set up element 150 is positioned in a spindle receiving opening 196 in the clamping element support plate 96, see FIG. 2. Preferably, the support structure 92 is in its nut-securement position. The first element 150 is provided with a bore 150a adapted to receive the spindle 114. Bolts 196a, which connect the plate 96 to the remaining portion of the support structure 92, are loosened. The holes (not shown) in the plate 96 through which the bolts 196a pass are oversized. The spindle 114 is lowered and the plate 96 is adjusted relative to the remaining portion of the support structure 92 such that the spindle 114 passes through the bore 150a in the first element 150. The bolts 196a are then tightened such that the plate 96 is properly positioned relative to the spindle 114.

Figure 3:
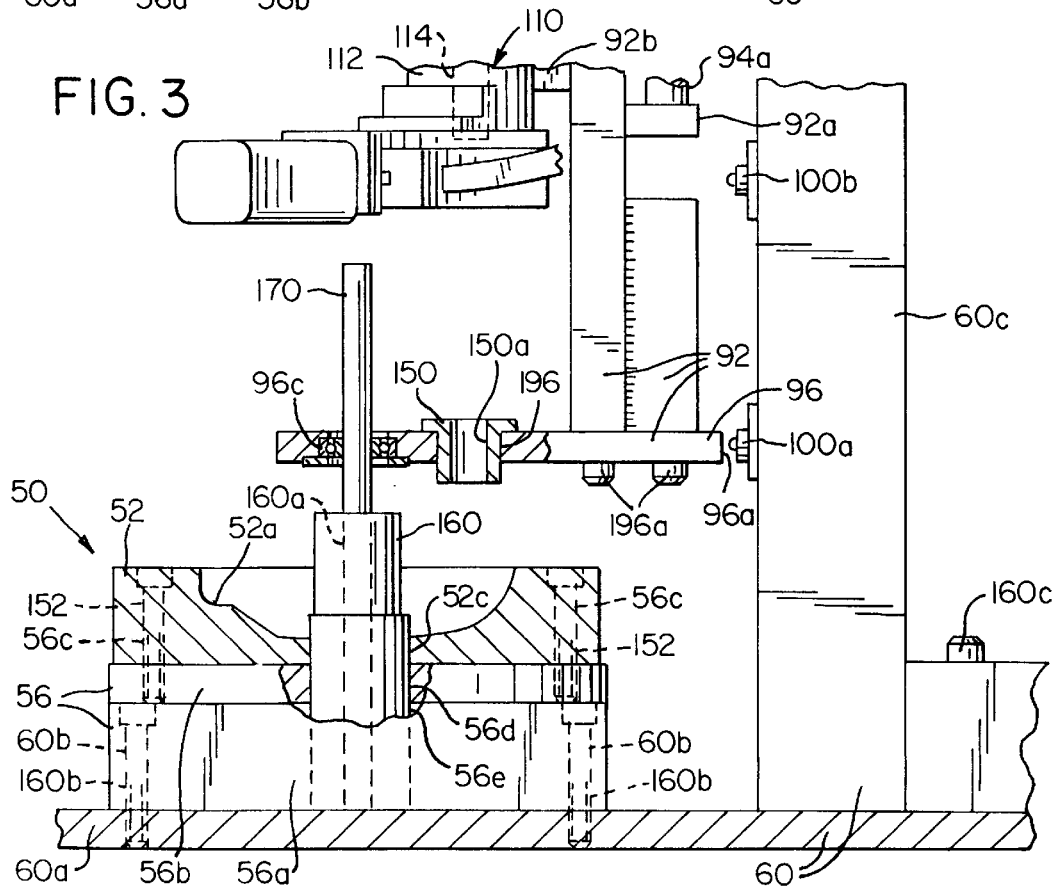

A second set up element 160 is provided which is adapted to pass through a bore 52c in the nest 52 and bores 56e and 56d in the rotary table base portion 56a and upper portion 56b when the nest 52 is properly positioned relative to the rotary table 56, see FIG. 3. If the second set up element 160 passes through the nest 52 but not through the bores 56d and 56e in the rotary table 56, the bolts 56c which secure the nest 52 to the upper-portion 56b of the rotary table 56 are loosened and the nest 52 is moved relative to the rotary table 56 until the second set up element 160 passes through the bores 56d and 56e. Openings 152 provided in the nest 52 through which the bolts 56c pass are oversized. After adjustment of the nest 52 relative to the upper portion 56b has occurred, the bolts 56c are retightened.

A third set up element 170 is provided for use in adjusting the position of the holder device 50 relative to the clamping element support plate 96. Initially, the retainer ring 96d is removed from the shaft 144a of the clamping element 141 and the shaft 144a is removed from the bearing 96c provided in the plate 96. The third element 170 is then passed through the bearing 96c in the plate 96. When the holder device 50 is properly positioned relative to the plate 96, the third element 170 easily passes through a bore 160a provided in the second set up element 160, which element 160 is positioned in the bores 52c, 56d and 56e and is resting on the upper surface of the plate portion 60a of the support frame 60, see FIG. 3. If the third set up element 170 is not capable of passing through the bore 160a, bolts 60b which connect the rotary table base portion 56a to the plate portion 60a are loosened and the rotary table 56 is moved relative to the plate portion 60a until the third element 170 passes through the bore 160a. Openings 160b in the base portion 56a through which the bolts 60b pass are oversized.

Alternatively, bolts 160c which connect the upper portion 60c of the apparatus support frame 60 to the plate portion 60a of the support frame 60 are loosened and the upper portion 60c is moved relative to the plate portion 60a until the third element 170 passes through the bore 160a. The bolts 160c are then retightened. Openings (not shown) in the upper portion 60c through which the bolts 160c pass are oversized. Once the plate 96 and the holder device 50 have been properly positioned relative to one another, the second element 160 is removed from the rotary table 56 and the nest 52 and the fourth element 170 is removed from the bearing 96c. The clamping element shaft 144a is then resecured in the bearing 96c.

A fourth set up element 180 is provided for use in determining the steps or positions to which the stepper-motor moves to sequentially position the studs 34 in the nut-applying station 88 below the spindle 114. The fourth set up element 180 is provided with a recess 180a in its distal end which is adapted to fit over a stud 34 when the stud 34 is properly positioned in the nut-applying station 88, see FIG. 4. The step at which the stepper-motor is positioned is then programmed into the driver/indexer unit which, as noted previously, forms part of the stepper-motor. Similar steps are performed for the remaining three studs 34. The driver/indexer unit may be programmed such that the studs 34 are moved to the nut-applying station 88 in any order. For example, in FIG. 8, a first stud 34a is shown with a nut 80 secured to it while an adjacent, second stud 34b is about to receive a nut 80. It is also contemplated that a third stud 34c could receive a nut 80 before the second stud 34b, then the second stud 34b would receive a nut 80 followed by a fourth stud 34d. Other sequences are also possible.

Operation of the properly set up apparatus 10 will now be described. With the nest 52 at its load position, an operator inserts an air bag unit 30 into the nest 52. An inflator 20 is then positioned by the operator over the air bag unit 30 such that the studs 34 pass through the openings 21 in the ears 20a–20d of the inflator 20. Next, the strap 53 is secured to the pin 52b such that the air bag unit 30 and the inflator 20 are secured in the nest 52, see FIG. 1. The operator then actuates an activation switch (not shown) which sends a start signal to the processor 70.

The processor 70 generates a signal to the valve bank 72 causing the support structure 92 to move to its nut-securement position such that the inflator 20 and the air bag unit 30 are clamped between the nest 52 and the clamping element 141, see FIG. 6. The processor 70 then generates a signal causing the stepper-motor to move to its first-stored-step position such that the first stud 34a is positioned at the nut-applying station 88, see FIG. 5. The processor 70 also generates a signal to the valve bank 72 causing the second drive device 118 to move the spindle 114 downwardly. The processor 70 additionally generates a signal to the driver device controller 74 instructing it to initiate rotation of the spindle 114. Thus, the spindle 114, after it has received a nut 80, begins to rotate. When the rotating nut 80 contacts the stud 34a, the spindle 114 is in an initial nut fastening position. The spindle 114 then continues its downward movement until it reaches its final nut-fastening position, shown in FIG. 7, where the nut 80 has been fully tightened onto the stud 34a. Thereafter, the spindle 114 retracts prior to nest rotation. Similar steps are performed for each of the three remaining studs 34b–34d. Because the clamping element 141 is rotatable with the inflator 20, the air bag unit 30 and the nest 52, the support structure 92 can be maintained in its nut-securement position between nut-securement operations. Hence, the multiple nut-securement operations are capable of being performed during a reduced time cycle since the support structure 92 is not required to be moved to its retracted position between nut-securement operations.

After nuts 80 have been secured to the four studs 34a–34d, the support structure 92 is raised to its retracted position and the rotary table 56 moves the nest 52 to its load position, see FIG. 9. The operator then removes the inflator-air bag assembly 40 from the nest 52.

It is also contemplated that the plate portion 60a of the apparatus 10 may be mounted on or form part of a folding engine such as the one disclosed in U.S. Pat. No. 5,575,748, the disclosure of which is hereby incorporated by reference.

Having described the invention in detail and by reference to the preferred embodiments thereof, it will be apparent that other modifications and variations are possible without departing from the scope of the invention defined in the appended claims.

What is claimed is:

1. An apparatus for assembling an inflator and an air bag unit into an inflator-air bag assembly comprising:
   a frame;
   a holder device coupled to said frame and including a movable nest adapted to receive an air bag unit and an inflator, said air bag unit having at least one stud which is capable of passing through at least one stud receiving opening provided in said inflator, said nest being adapted to move said air bag unit and said inflator such that said at least one stud is moved to a nut-applying station; and
   a driver unit coupled to said frame and adapted to secure said at least one nut to said at least one stud to assemble said inflator and said air bag unit into an inflator-air bag assembly, said driver unit comprising: support structure which is movable back and forth between a retracted position and a nut-securement position; a nut driver device which is coupled to said support structure such that said nut driver device is positioned at said nut-applying station when said support structure is located in said nut-securement position and being adapted to join said at least one nut to said at least one stud; and a clamping element movably coupled to said support structure for engaging said inflator when said support structure is in said nut-securement position so as to act with said nest to clamp said inflator and said air bag unit together, said clamping element moving with said inflator and said air bag unit as said stud is moved to said nut-applying station by said nest.

2. An apparatus as set forth in claim 1, further comprising a processor for controlling the operation of said holder device and said driver unit.

3. An apparatus as set forth in claim 2, wherein said holder device further comprises a rotary table including a base portion which is fixedly mounted to said frame, a rotatable upper portion which is coupled to said base portion and fixedly coupled to said nest, and a motor for effecting rotation of said upper portion, said motor being coupled to said processor such that said processor controls the operation of said motor.

4. An apparatus as set forth in claim 3, wherein said motor comprises a servomotor.

5. An apparatus as set forth in claim 3, wherein said motor comprises a stepper-motor.

6. An apparatus as set forth in claim 1, wherein said clamping element comprises a plate member and a shaft which is fixed to said plate member.

7. An apparatus as set forth in claim 6, wherein said support structure comprises a clamping element support plate having an opening provided with a bearing for rotatably receiving said shaft of said clamping element.

8. An apparatus as set forth in claim 1, wherein said nut driver device comprises:
   a spindle having a recess in a distal end thereof for receiving a nut;
   a first spindle drive device adapted to effect rotation of said spindle; and
   a second spindle drive device adapted to effect movement of said spindle such that said spindle moves from a retracted position to an initial nut-fastening position where said nut is in engagement with said stud to a final nut-fastening position where said nut has been fully secured to said stud.

9. An apparatus for assembling an inflator and an air bag unit into an inflator-air bag assembly comprising:
   a frame;
   a holder device coupled to said frame and including a rotatable nest adapted to receive an air bag unit and an inflator, said air bag unit having at least two studs which are capable of passing through at least two stud receiving openings provided in said inflator, said nest being adapted to rotate said air bag unit and said inflator such that said at least two studs are moved to a nut-applying station in a defined pattern; and
   a driver unit adapted to secure said at least two nuts to said at least two studs to assemble said inflator and said air bag unit into an inflator-air bag assembly, said driver unit comprising: support structure which is movable back and forth between a retracted position and a nut-securement position; a nut driver device which is coupled to said support structure such that said nut driver device is positioned at said nut-applying station when said support structure is located in said nut-securement position and being adapted to join said nuts to said studs; and a clamping element rotatably coupled to said support structure for engaging said inflator when said support structure is in said nut-securement position so as to act with said nest to clamp said inflator and said air bag unit together, said clamping element rotating with said inflator, said air bag unit and said nest as said studs are moved to said nut-applying station in a defined manner.

10. An apparatus as set forth in claim 9, further comprising a processor for controlling the operation of said holder device and said driver unit.

11. An apparatus as set forth in claim 10, wherein said holder device further comprises a rotary table including a base portion which is fixedly mounted to said frame, a rotatable upper portion which is coupled to said base portion and fixedly coupled to said nest, and a motor for effecting rotation of said upper portion, said motor being coupled to said processor such that said processor controls the operation of said motor.

12. An apparatus as set forth in claim 11, wherein said motor comprises a servomotor.

13. An apparatus as set forth in claim 11, wherein said motor comprises a stepper-motor.

14. An apparatus as set forth in claim 9, wherein said clamping element comprises a plate member and a shaft which is fixed to said plate member.

15. An apparatus as set forth in claim 14, wherein said support structure comprises a clamping element support plate having an opening provided with a bearing for rotatably receiving said shaft of said clamping element.

16. An apparatus as set forth in claim 9, wherein said nut driver device comprises:
 a spindle having a recess in a distal end thereof for receiving a nut;
 a first spindle drive device adapted to effect rotation of said spindle; and
 a second spindle drive device adapted to effect movement of said spindle such that said spindle moves from a retracted position to an initial nut-fastening position where said nut is in engagement with said stud to a final nut-fastening position where said nut has been fully secured to said stud.

\* \* \* \* \*